United States Patent [19]

Halpern

[11] Patent Number: 4,740,547

[45] Date of Patent: Apr. 26, 1988

[54] AROMATIC POLYSULFONE THERMOPLASTICS PROTECTED FROM DISCOLORATION DURING THERMAL PROCESSING

[75] Inventor: Yuyal Halpern, Skokie, Ill.

[73] Assignee: Borg-Warner Chemicals, Inc., Parkersburg, W. Va.

[21] Appl. No.: 49,873

[22] Filed: May 14, 1987

Related U.S. Application Data

[63] Continuation-in-part of Ser. No. 929,445, Nov. 12, 1986, Pat. No. 4,695,601.

[51] Int. Cl.$^4$ .............................................. C08K 5/07
[52] U.S. Cl. ................................... 524/359; 524/356; 524/361; 524/362
[58] Field of Search ................ 524/356, 359, 361, 362

[56] References Cited

U.S. PATENT DOCUMENTS

3,755,256  8/1973  Beverly ................................. 260/49
3,794,615  2/1974  Beverly et al. .................... 260/45.7
3,845,162  10/1974  Hess et al. ........................... 260/863

FOREIGN PATENT DOCUMENTS

0176811  9/1985  European Pat. Off. .

*Primary Examiner*—Lewis T. Jacobs
*Attorney, Agent, or Firm*—Emily A. Richeson

[57] ABSTRACT

A thermoplastic composition is provided which comprises an aromatic polysulfone with an effective amount of an alpha-hydroxyketone such as benzoin to prevent discoloration on thermal processing.

12 Claims, No Drawings

AROMATIC POLYSULFONE THERMOPLASTICS PROTECTED FROM DISCOLORATION DURING THERMAL PROCESSING

BACKGROUND OF THE INVENTION

The present application is a continuation-in-part of application Ser. No. 929,445, filed Nov. 12, 1986, now U.S. Pat. No. 4,695,601.

The present invention relates generally to aromatic polysulfone thermoplastics protected against discoloration during thermal processing, and to methods for making said discoloration-resistant aromatic polysulfone compositions.

Discoloration is generally viewed as a detriment to a plastic, since it spoils the appearance of the plastic. Discoloration may give the impression of non-uniformity, and is often associated by the customer with inferior properties, whether or not it is associated with actual degradation of the other physical properties of the polymer.

The art of compounding of plastics encompasses a wide variety of stabilizers and discoloration preventatives which tend to differ from plastic to plastic. In the foregoing and following discussion, the term "preventing" or "prevention" or "preventative" is used in a relative sense rather than in an absolute sense, i.e. by prevention is meant suppression relative to an untreated control sample.

Vinyl polymers such as PVC are successfully prevented from yellowing by alkyltin compounds, barium-cadmium salts, and calcium-zinc salt mixtures. These stabilizers are believed to retard formation of conjugated double bonds which cause color. In polyolefins (which can degrade without a great deal of discoloration), the required stabilization is more directed to preventing autooxidation with loss of mechanical properties than to preventing discoloration. To this end, various phenols in combination with phosphites or organic sulfides are commonly used. In styrenic polymers such as ABS, it is also common practice to use tertiarybutylphenols plus phosphites. Here again, much of the concern is protection against loss of mechanical properties, although prevention of discoloration is sometimes a consideration. In nylon 6,6, especially for fiber use, discoloration during thermal processing is a serious problem and discoloration preventatives such as phenylphosphinic acid are used. In polyester fiber and film, various phosphorus additives are used to prevent discoloration.

The development of the newer high-performance thermoplastics (the so-called "engineering thermoplastics" which includes the aromatic polysulfones) has imposed more stringent needs for preventing degradation, including that part of degradation which manifests itself as discoloration. The structures, mode of synthesis, and mode of degradation are different from the earlier plastics mentioned above. Most of these high-performance thermoplastics have heteroatoms (i.e. atoms other than carbon) in the backbone of the polymer, which makes their chemistry quite different from the chemistry of purely carbon-chain polymers. Moreover, the processing of these thermoplastics tends to be carried out at higher temperatures than the older lower-temperature thermoplastics. For example, engineering thermoplastics are commonly processed above 450° F. and frequently at or above 570° F. Since discoloration often occurs at the high temperatures used for mixing, molding, and extruding the engineering thermoplastics, there is a need for additives which can prevent discoloration in engineering thermoplastics at higher temperatures.

Discoloration during processing is, unfortunately, not satisfactorily prevented by polymer stabilizers which perform well in polymers processed at lower temperatures, such as polystyrene, polyethylene, polypropylene, ABS, PVC, diene elastomers, and the like. Some of the stabilizers described in the prior art for use in the engineering thermoplastics perform reasonably well in the lower end of the processing temperature range but decline badly in activity as the processing temperature reaches or exceeds 300° C. (about 570° F.). Moreover, while these stabilizers may have a beneficial effect in retarding loss of physical properties such as impact or tensile strength, they are often less effectual in preventing discoloration during thermal processing. Paradoxically, some stabilizers, such as those containing aromatic amino structures, may perform well as antioxidants while actually contributing to darkening of color.

This requirement for discoloration preventatives in the processing (hot mixing, molding, and extrusion) of thermoplastics is also quite different from the requirement for stabilizers intended to protect the plastic during its service life, which for obvious reasons must be at temperatures lower than its processing temperature. Those stabilizers which are known for protection against atmospheric oxidation and photodegradation at the service temperatures of the plastic are generally found to be disappointing as high-temperature thermal processing stabilizers, and particularly disappointing in regard to prevention of discoloration during thermal processing.

A further source of unpredictability lies in the structures of the polymers themselves. Different polymer structures have mechanistically different modes of discoloration, and the identity of the color-producing structures ("color bodies" or chromophores) is generally not known. From a knowledge of the "color bodies" in one kind of polymer, it is not possible to predict the factors affecting another kind of polymer.

The aromatic polysulfones are an important class of engineering thermoplastics. They are typically thermally processed (molded or extruded) at temperatures in the 500°–780° F. range, most commonly above 600° F. Their physical properties are well maintained during thermal processing and their moderate discoloration under the same conditions has been generally tolerated or compensated for by the addition of blue toners to conteract any yellowish or amber color which might develop. However, in some applications, the aromatic polysulfone thermoplastics must compete with glass or with clear colorless thermoplastics; for example, in lamp bezels, battery caps, fuses, face masks, cookware, flowmeters, sanitary pipe, sight glasses for gauges, food processing equipment, surgical equipment, and watch crystals. For such applications, clarity and absence of color is quite important. Moreover, the reuse of scrap (regrind) is economically important with these relatively higher priced polymers; discoloration must be retarded if the use of regrind is not to result in poorer appearance or increased product variability.

Yet another reason why discoloration preventatives are desired is to allow the molder or extruder more latitude on temperature settings and to allow more variability in regard to residence time of the resin in the molding or extruding equipment. With non-color-stabilized resin, excessive residence of the resin in the equipment may result in dark streaking of the product, and may require wasteful purging to remove discolored resin from the equipment. Furthermore, greater latitude in processing temperature can permit faster cycles at higher temperature, or the use of less powerful molding or extruding machinery by virtue of lower resin melt viscosity at higher temperatures.

Remarkably, the literature shows that little has been done to prevent the formation of color in the processing of aromatic polysulfones. The use of certain phosphorus compounds as stabilizers and discoloration inhibitors for aromatic polysulfones was described by Beverly, U.S. Pat. No. 3,755,256 (Aug. 28, 1973) and U.S. Pat. No. 3,794,615 (Feb. 26, 1974), but these only offer a partial solution to the discoloration of aromatic polysulfones. In commercial practice the discoloration has usually been ignored or partially masked by pigments.

It has now unexpectedly been found that compounds of the alpha-hydroxyketone class, which includes the benzoins, are discoloration preventatives for aromatic polysulfones. This finding is quite surprising since these alpha-hydroxyketones are themselves not exceptionally stable to heat. For example, benzoin was reported by Lachman, J. Am. Chem. Soc. 46, 717–718 (1924) to decompose at 300° C. (527° F.) to benzaldehyde, deoxybenzoin, and other products.

It was disclosed in European Patent Application No. 0 176 811 (date laid open: 4/9/86) that certain benzoins are stabilizers for ABS, an acrylonitrile/styrene/butadiene graft copolymer. However, this European application indicates that the anti-discoloration action diminishes rapidly as the processing temperature is raised and becomes quite poor around 300° C. (572° F.), thus suggesting inapplicability to high-temperature-processed thermoplastic (see FIG. 1 in the cited application). However, according to the present invention, the benzoins work as color preventatives in aromatic polysulfones, which are typically processed above 600° F. and have little structural resemblance to ABS.

SUMMARY OF THE INVENTION

The present invention is a thermoplastic composition comprising an aromatic polysulfone, and which further comprises, as an additive to suppress discoloration during thermal processing, an effective amount of an alpha-hydroxyketone, preferably having at least one hydrogen atom on the hydroxyl-bearing carbon atom of said ketone.

The present invention also includes a method for minimizing the discoloration of polysulfone thermoplastics by combining said thermoplastic, preferably prior to thermal processing, with an effective amount of an alpha-hydroxyketone.

DETAILED DESCRIPTION OF THE INVENTION

The composition of the present invention comprises an aromatic polysulfone and an effective discoloration-preventing amount of an alpha-hydroxyketone, preferably having at least one hydrogen atom on the hydroxyl-bearing carbon atom of said ketone.

The aromatic polysulfones include the thermoplastics sometimes called polyether sulfones, and the general structure of their repeating unit has a diaryl sulfone structure which may be represented as -arylene-SO$_2$-arylene-. These units may be linked to one another by carbon-to-carbon bonds, carbon-oxygen-carbon bonds, carbon-sulfur-carbon bonds, or via a short alkylene linkage, so as to form a thermally stable thermoplastic polymer.

Particularly important and preferred aromatic polysulfones are those comprised of repeating units of the structure —C$_6$H$_4$SO$_2$—C$_6$H$_4$—O— where C$_6$H$_4$ represents an m- or p- phenylene structure. The polymer chain can also comprise repeating units such as —C$_6$H$_4$—, C$_6$H$_4$—O—, —C$_6$H$_4$—(lower-alkylene)—C$_6$H$_4$—O—, C$_6$H$_4$—O—C$_6$H$_4$—O—, —C$_6$H$_4$—S—C$_6$H$_4$—O—, and other thermally stable substantially-aromatic difunctional groups known in the art of engineering thermoplastics. Within that subgroup are individual preferred polymers, namely, (a) the polysulfone made by condensation polymerization of bisphenol A and 4,4'-dichlorodiphenyl sulfone in the presence of base, and having the main repeating structure

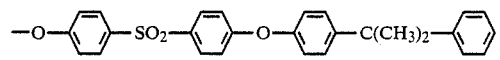

exemplified by Union Carbide's UDEL ® resin, (b) the polysulfone made by condensation polymerization of 4,4'-dihydroxydiphenyl and 4,4'-dichlorodiphenyl sulfone in the presence of base, and having the main repeating structure

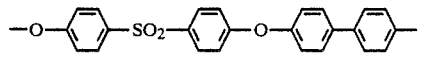

exemplified by Union Carbide's RADEL ® resin; and (c) a condensation polymer made from 4,4'-dichlorodiphenyl sulfone in the presence of base and having the principle repeating structure

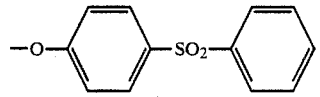

exemplified by ICI's VICTREX ® resin, and sometimes called a "polyether sulfone". The most preferred species of aromatic polysulfone for use in the composition and method of the invention is one formed by the condensation polymerization of bisphenol A and 4,4-dichlorophenyl sulfone, such as UDEL ® resin.

The discloration preventative to be used in the compositions and method of the invention is an alpha-hydroxyketone, preferably with at least one hydrogen atom on the hydroxylated carbon atom. The compounds suitable for use in the invention may be represented by the structure CRR"(OH)C(O)R' where R, R', and R" are independently selected from the group of hydrocarbyl radicals and where R and R" can also be hydrogen, R" preferably being hydrogen. Since the function of the compounds depends on the critical group —C(OH)C(O)—, wide variations of R and R' are permissable and these radicals, if hydrocarbyl, can be of many types, such as alkyl, alkenyl, cycloalkyl, cycloalkenyl haloalkyl, aryl, substituted aryl, and heterocyclic aliphatic or aromatic radicals. Examples of such ketones include butyroin, 5-hydroxyoctan-4-one, 9-hydroxyhexadecan-8-one, 1,4-diphenyl-3-hydroxybutan-2-one, 1,4-dicyclohexyl-3-hydroxybutan-2-one, 1,4- bis(4-methoxyphenyl)-3-hydroxybutan-2-one, 1,4-di-2-pyridyl-3-hydroxybutan-2-one, omega-hydroxy-2,4,5-trichloroacetophenone, 1,4-dichloro-3-hydroxybutan-2-one, 1,2-bis(2-oxacyclohex-3-enyl)-2-hydroxyethan-1-one, 4-hydroxyhexa-1,5-diene-3-one, 1,4-dicyclohexen-4-yl-3-hydroxybutan-2-one, and, in the less preferred category where R″ does not equal hydrogen, alpha-phenylbenzoin.

Non-interferring substituents may be present, i.e. substituents which do not cause instability or incompatibility with the resin. Such substituents will be readily evident to those skilled in the art. Examples of permissable substituents are: hydrocarbyl, hydrocarbyloxy, halogen, hydrocarbylthio, and carbalkoxycarbonyl. An example of an interfering substituent would be a second hydroxy; for instance dihydroxyacetone is incompatible and insufficiently stable. These skilled in the art would recognize that other interfering groups would be those that react with the ketone or hydroxy functional groups or those which are thermally unstable such as hydrazo. The two groups R and R′ can be conjoined to form a ring, as in 2-hydroxycyclohexanone, or can be members of a polymer chain such as the linear acyloin condensation product of a long chain dialdehyde such as the acyloin polymer from terephthalic or isophthalic dialdehyde.

Preferred R, R′, and R″ groups are alkyl of from 2 to 20 carbon atoms, phenyl, methoxyphenyl, or halophenyl. Where R and R′ are the same group and R″ is hydrogen, such compounds are readily made in one step from available aldehydes by the well-known acyloin condensation rection. Especially preferred because of its ready availability and good performance is benzoin, in which R and R′ are both phenyl. The two groups R and R′ need not be identical; for instance hydroxypropiophenone (R=methyl, R′=phenyl) is an effective compound for use in the invention.

It is also preferred that the alpha-hydroxyketone be one which is substantially colorless, so as not to obscure the color benefit intended from its use. An example of an undesirably colored ketone is pivaloin, which is orange and of marginal utility therefore. Other examples will be obvious to one skilled in the art, for example alphahydroxyketones with known chromophoric groups such as azo groups would be undesirable for the reason given. The term "substantially colorless" is intended to allow for a pale color which will be considered unobjectionable at the use dilution in the resin.

An effective amount of the discoloration preventing additive to be used in the compositions and method of the invention is that which gives the desired color benefit in the aromatic polysulfone thermoplastic, and is preferably in the range of 0.05 to 5% by weight. Lesser amounts may not produce enough color benefit; greater amounts may be wasteful and may exude, produce odor, or plasticize excessively. As will be recognized by those skilled in the art of plastics compounding, the best amount to be used in any given case will be determined readily, amounts near the low end of the stated range being used where color standards are lenient, processing conditions relatively mild, or the resin relatively insensitive to discoloration, whereas amounts near the high end of the stated range would be used where color requirements are demanding, processing conditions relatively stringent (exceptionally high temperature and/or long time), and the resin relatively sensitive to discoloration.

The compositions of the invention also encompass blends of the aromatic polysulfones with each other and with other polymers and copolymers, such as polyimides, polyamides, poly(amide-imides), and polyesters.

Likewise other processing ingredients may be included, as will be evident to those skilled in the art of polymer compounding. Such ingredients include stabilizers against degradation under service conditions; processing aids, flow improvers, mold release agents; antistatic agents; colorants; titanium dioxide; odorants; electrical conductivity modifiers; filters; reinforcing agents; impact modifiers; fire retardants; and plasticizers. In thermoplastic aromatic polysulfones, reinforcing fillers may be used, such as glass fibers and spheres, carbon fibers, and polytetrafluoroethylene. Combinations with other discoloration preventatives such as the phosphorus compounds taught by Beverly (cited above) are also contemplated within the scope of the invention. Such combinations are often beneficial and may even be found to be synergistic.

In the method aspect of the invention, the thermoplastic resin and the discoloration-preventing additive are mixed by any of a variety of techniques, such as mixing in a Banbury mixer, dry blending, melt blending, extrusion, or milling.

In the preferred method of the invention, diminishing the discoloration of the thermoplastic aromatic polysulfone from thermal processing at high temperature, such as above 550° F. and more specifically above 600° F., is best accomplished by admixing the discoloration-preventing additive of the invention in an effective amount before much thermal discoloration has occurred, that is, preferably, before the polysulfone has undergone thermal processing. This admixing may be accomplished using any of the mixing methods named above. For instance, the mixing of the color preventative can be done near the low end of the acceptable processing temperature range, or very quickly if at the high end of this range. However, even if some discoloration has already occurred, admixing the additive of the invention may possibly lighten it somewhat or at least prevent further darkening.

The practice of the invention will be better understood by the following examples. In the following examples the term "lightness" refers to the attribute of color perception by which an object is judged to reflect more or less light than another object. The lightness measurements were carried out by molding flat plates of the polymer and evaluating their lightness using a Lab-scan 2 Spectrocolorimeter (manufactured by the Hunter Associates Laboratory, Inc.). The reflectance in the visual wave length range is measured and expressed on a scale of from 0 to 100, where 0 is total blacknes (no reflectance) and 100 is equal to the standard for total whiteness. The larger the number, the lighter the plastic. The method and principles are discussed by Billmeyer and Saltzman in "Principles of Color Technology," Wiley-Interscience, New York, N.Y. (1966), chapters 1 and 2.

Commercial aromatic polysulfone (UDEL ® resin, general purpose grade P-1700, structure as defined for UDEL ® resin above), was injection molded at 650° F. with and without admixing (by dry blending) 0.5 parts of benzoin per hundred parts of resin. The color of the molded plates was 86 with the benzoin admixed, and 80 without the benzoin.

In like manner, the admixture (by dry blending, such as with a ribbon mixer) of 0.2 parts of benzoin, or 0.5 parts of anisoin may also lessen the color developed in processing of RADEL ® aromatic polysulfone (structure as defined above) at 700° F. Similarly, the admixture of 1 part of benzoin may lessen the color developed in injection molding of VICTREX ® (structure defined above) at 650° F.

These examples are presented for reasons of illustration and are not intended to limit the invention, as defined by the following claims.

What I claim is:

1. A thermoplastic composition comprising an aromatic polysulfone and an alpha-hydroxyketone, said ketone being present in an amount sufficient to suppress discoloration of said composition during processing.

2. A thermoplastic composition comprising an aromatic polysulfone and an alpha-hydroxyketone having at least one hydrogen atom on the carbon bearing the hydroxyl group, said ketone being present in an amount sufficient to suppress discoloration of the composition during processing.

3. The composition of claim 2 where the ketone is substantially colorless.

4. The composition of claim 2 where the ketone is benzoin.

5. The composition of claim 2 where the ketone is anisoin.

6. The composition of claim 2 where the ketone is 4,4'-dichlorobenzoin.

7. The composition of claim 2 where the aromatic polysulfone comprises a condensation polymer having repeating units of the structure $-C_6H_4-SO_2-C_6H_4-O-$.

8. The composition of claim 2 where the aromatic polysulfone comprises a condensation polymer of bisphenol A and 4,4'-dichlorodiphenyl sulfone.

9. The composition of claim 2 where the aromatic polysulfone is a polyether sulfone condensation polymer of 4,4'-dichlorodiphenyl sulfone.

10. The composition of claim 2 where the aromatic polysulfone is a condensation polymer of 4,4'-dichlorodiphenyl sulfone and 4,4'-dihydroxydiphenyl.

11. A method for the prevention of discoloration of an aromatic sulfone thermoplastic during thermal processing, said method comprising mixing into said thermoplastic, prior to the thermal processing, an effective amount of an alpha-hydroxyketone having at least one hydrogen atom on the hydroxyl-bearing carbon atom of said ketone.

12. The method of claim 11 where the ketone is benzoin.

* * * * *